United States Patent [19]

Welch

[11] 4,378,306
[45] Mar. 29, 1983

[54] SURFACE HEAT TREATMENT OF SILICA-CONTAINING CATALYST BASE

[75] Inventor: Max P. McDaniel; M. Bruce Welch, both of Bartlesville, Okla.

[73] Assignee: Phillips Petroleum Company, Bartlesville, Okla.

[21] Appl. No.: 303,302

[22] Filed: Sep. 17, 1981

[51] Int. Cl.³ .................. B01J 21/06; B01J 23/26
[52] U.S. Cl. .................................. 252/452; 252/458
[58] Field of Search ............... 252/458, 467, 452; 526/105, 106; 423/337

[56] References Cited

U.S. PATENT DOCUMENTS

| | | | |
|---|---|---|---|
| 2,488,150 | 11/1949 | Walden et al. | 252/471 |
| 3,132,125 | 9/1960 | Schwander et al. | 526/106 |
| 3,264,226 | 8/1966 | Johnson | 252/465 |
| 3,281,405 | 10/1966 | Hogan | 252/458 X |
| 3,446,754 | 5/1969 | Solvik et al. | 252/458 |
| 3,485,771 | 12/1966 | Horvath | 252/430 |
| 3,887,494 | 6/1975 | Dietz | 252/452 |
| 3,959,178 | 5/1976 | Hogan | 252/430 |

*Primary Examiner*—Carl F. Dees

[57] ABSTRACT

A silica base for a chromium olefin polymerization catalyst is subjected to a high temperature treatment as for instance by passing the silica through a flame in order to alter the surface characteristics. The chromium can be present during the flame treatment or added later. The result is a catalyst capable of giving a broader molecular weight distribution polymer which is of particular value with the silica-titania coprecipitated catalyst used in slurry olefin polymerization.

12 Claims, 1 Drawing Figure

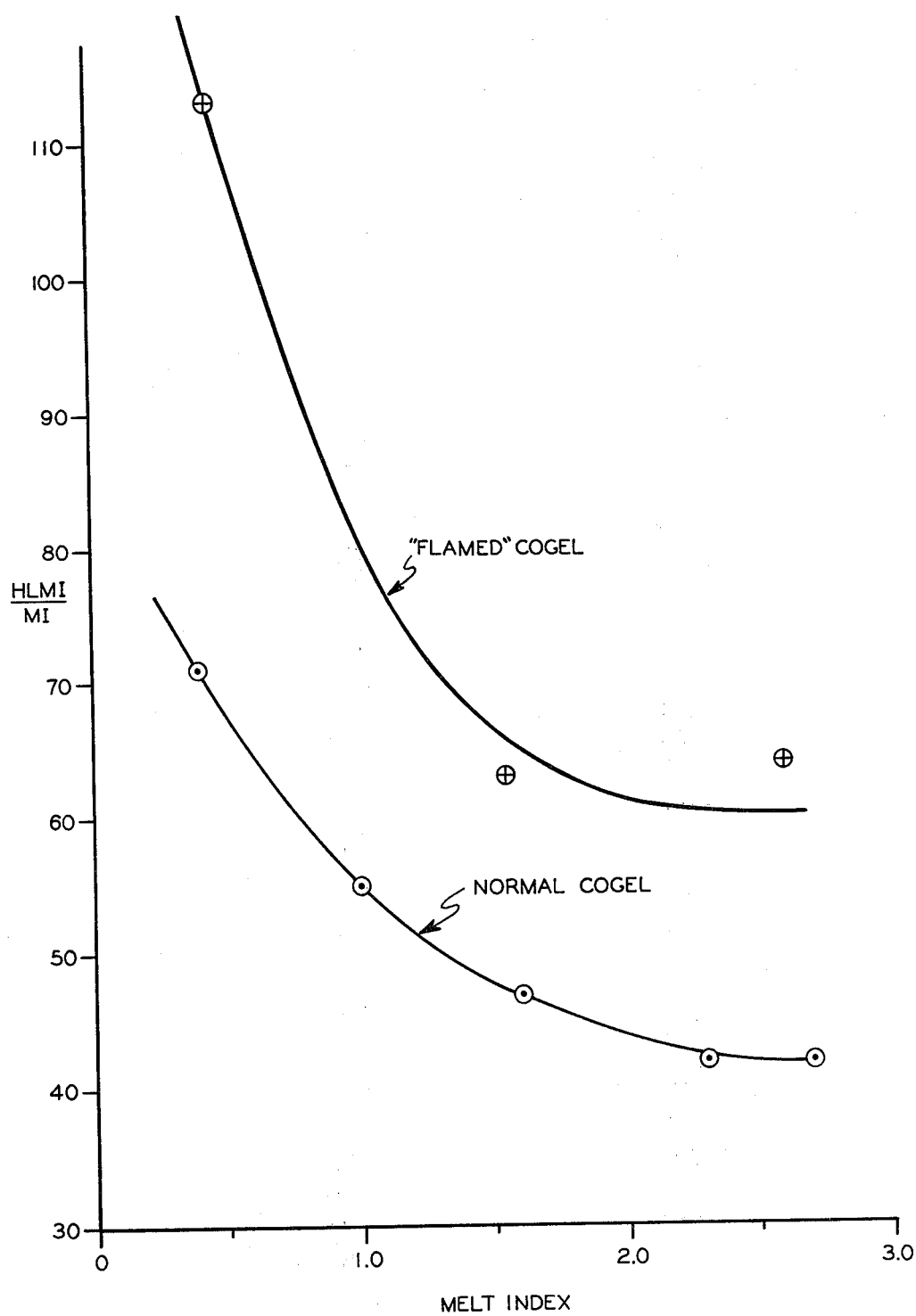

SURFACE HEAT TREATMENT OF SILICA-CONTAINING CATALYST BASE

BACKGROUND OF THE INVENTION

This invention relates to a treatment of silica catalyst bases.

Chromium oxide catalysts on a silica-containing support have long been used to prepare olefin polymers in a hydrocarbon solution to give a product having excellent characteristics from many standpoints. As commercialization of this process became widespread, it became evident that polymer could be produced more economically utilizing a slurry system achieved by carrying out the polymerization at a temperature low enough that the resulting polymer did not go into solution in the diluent used. This process, frequently referred to as a particle form process, while being less complex has certain drawbacks. For one thing, certain control operations which are easily carried out in the solution process are considerably more difficult in the particle form process. Particularly with regard to the molecular weight, it is a simple matter in the solution process to control molecular weight by changing the temperature, with lower molecular weight (higher melt flow) polymer being obtained at the higher temperatures. However, in the slurry process, this technique is inherently limited since any effort to increase the melt flow to any appreciable extent by increasing temperature would cause the polymer to go into solution and thus destroy the slurry or particle form process. This problem has been largely circumvented by catalyst modifications which inherently give a higher melt flow polymer under a given set of conditions. For instance, a small amount of titanium can be coprecipitated with the silica to produce a cogel base and admixed with a chromium compound to provide a catalyst which has the inherent capability of giving higher melt flow polymer. This, however, can create an additional problem in that polymer having a relatively narrow molecular weight distribution is generally produced. Such polymers are ideally suited for some applications but for other applications, a broader distribution is essential. A broader distribution could be obtained by simply forming two different types of catalysts and physically mixing them but this would create two separate polymers which can segregate and thus create a lack of homogeneity in the final product.

SUMMARY OF THE INVENTION

It is an object of this invention to produce a catalyst capable of giving broad molecular weight distribution;

It is a further object of this invention to take advantage of the inherent high melt flow capability of silica-titania-cogelled catalyst without a sacrifice in molecular weight distribution of polymers produced therewith;

It is a further object of this invention to provide an improved olefin polymerization catalyst; and It is still yet a further object of this invention to provide an improved olefin polymerization process.

In accordance with this invention particulate silica-containing material is subjected to a brief but intense heat treatment so as to alter the surface of the particles.

BRIEF DESCRIPTION OF THE DRAWING

The drawing, forming a part hereof, shows the consistent improvement in HLMI/MI ratio for catalyst made in accordance with the invention.

DESCRIPTION OF THE PREFERRED EMBODIMENTS

The silica-containing material treated in accordance with this invention is generally composed of 80 to 100 weight percent silica (either with or without chromium as will be discussed hereinafter), the remainder, if any, being selected from alumina, boria, magnesia, thoria, titania, zirconia, or mixtures thereof. The silica-containing material can consist essentially of silica and no more than 0.2 weight percent alumina but is preferably a silica-titania cogel formed by precipitating the silica in the presence of a sufficient amount of a titanium compound to give 0.1 cordance with this invention. Large pore silicas particularly suitable for treatment in accordance with this invention are described in Dietz, U.S. Pat. No. 3,887,494 (June 3, 1975) which covers the preparation of silica/titania cogels and Witt, U.S. Pat. No. 3,900,457 (Aug. 19, 1975) covering the preparation of synthetic silica, the disclosures of which are hereby incorporated by reference.

Inherently, tergels formed by coprecipitating the silica, titanium, and chromium have the chromium present during the surface heat treatment. In the case of silicas which do not have chromium coprecipitated therewith, the chromium can either be incorporated prior to the heat treatment preferably by means of an aqueous solution of a chromium compound being impregnated into the hydrogel stage or a nonaqueous solution of a chromium compound being impregnated into the xerogel stage as is well known in the art.

Alternatively, the chromium can be added after the heat treatment of the surface. In this latter case, if the starting material is a large pore silica particularly a silica-titania cogel, the chromium incorporation is preferably carried out by means of an anhydrous solution or if an aqueous solution is used, the water is removed by azeotropic distillation or washing with a volatile water miscible organic compound so as to minimize damage to the interior pores of the silica. Such water removal techniques are broadly shown in the Dietz and Witt patents described hereinabove.

However the chromium is incorporated, the final catalyst contains a conventional amount of chromium which is generally an amount within the range of 0.001 to 10, preferably 0.1 to 5, more preferably about 1 weight percent based on the weight of the dried silica-containing material (xerogel).

The heat treatment in accordance with this invention is preferably carried out simply by passing the particulate silica-containing material through a flame, e.g. oxy-hydrogen, natural gas, or other conventional flame sources. This can be done either by the use of a gun effect wherein the particulate silica-containing material is passed axially through a burner into the flame or the silica-containing material can simply be dropped through the flame. Any heat treatment which will achieve the desired temperature can be utilized including the use of a furnace or a blast of hot gas, the essential feature being that the treatment zone has a very high temperature and the residence time is very short so as to allow sintering or melting of the outer surface so as to reduce the surface area and pore volume, generally by at least 50 percent, while leaving the interior of the particles essentially unchanged insofar as pore volume and surface area are concerned. To achieve this, temperatures of 1200° to 4000° C., preferably about 1800° to 2500° C. are utilized in conjunction with residence times within the range of about 0.1 to 3, preferably 0.5 to 2 seconds. It is readily apparent that the higher temperatures and shorter residence time would generally go together and vice versa.

After the surface treatment, the chromium-containing catalyst is activated by heating in an oxygen-containing ambient such as air generally at a temperature of 500° to 1000° C., preferably 600° to 800° C. and a time of at least 5 minutes, preferably 0.5 to 24 hours, more preferably 1 to 4 hours in a conventional manner for activating silica supported chromium catalysts. The catalysts can also be given a reduction and reoxidation treatment. These treatments shown in McDaniel et al, U.S. Pat. No. 4,182,815 (January 8, 1980), the disclosure of which is hereby incorporated by reference.

The catalysts produced in accordance with this invention can be used to polymerize at least one mono-1-olefin containing 2 to 8 carb-pentene, 1-hexene, and 1-octene. Such catalysts are of particular applicability in producing ethylene homopolymers and copolymers of ethylene and one or more comonomers selected from 1-olefins containing 3 to 8 carbon atoms per molecule, such as propylene, 1-butene, 1-pentene, 1-hexene, and 1-octene. These polymers can be produced by solution polymerization, slurry polymerization, and gas phase polymerization using conventional equipment and contacting processes. Contacting of the monomer or monomers with the catalyst can be effected by any manner known in the art of solid catalysts. One convenient method is to suspend the catalyst in an organic medium and to agitate the mixture to maintain the catalyst in suspension throughout the polymerization process. Typically, predominantly ethylene copolymers are prepared using 0.5 to 20 weight percent comonomer as described above in the feed, preferably sufficient comonomer being used to give 97 to 99.6 weight percent polymerized ethylene units in the resulting copolymer.

Example I—Catalyst Preparation

A commercially obtained catalyst comprising chromium oxide supported on coprecipitated silica-titania (cogel catalyst) was employed in the form received. The catalyst consisted of chromium oxide in an amount giving about 1 weight percent chromium, titanium dioxide in an amount giving about 2.5 weight percent titanium, and the balance as silica. A horizontally disposed, laboratory-size glass blowing torch having a nozzle diameter of about ⅛ inch (0.32 cm) and a flame length of about 18 inches (46 cm) was used as the flame source. A metal foil was placed below the flame to collect catalyst passing through it. The collecting foil was arbitrarily divided into three zones as measured from the end of the burner nozzle. Zone A ranged from 0 to 3 inches (0 to 7.6 cm), zone B ranged from 3 to 9 inches (7.6 to 23 cm) and zone C was greater than 9 inches. The average pass time for catalyst traversing the flame ranged from less than 1/10 second (zone A) to greater than 3 seconds (zone C) with from about 0.5 to about 1 second for zone B.

In each run, portions of the catalyst was sprinkled through the flame at the end of burner nozzle. Catalyst falling through the flame was collected in zones A, B and C. Catalyst in zone A received too little flame treatment and catalyst in zone C received the most treatment (too much) since it was carried in the flame longer and it was exposed to the high temperatures a longer period of time. The flame temperature was estimated to be about 2000° C. at its hottest point ranging down to about 1200° C. at the end.

The collected, treated catalyst was subsequently activated for polymerization by calcination in a fluidized bed with dry air for 5 hours at 1600° F. The activated catalyst was recovered and stored in dry air until ready for use.

The untreated control catalyst was activated for 5 hours at 1400° F. (760° C.), recovered and stored until ready for use as above. A lower activation temperature was required to provide the control catalyst with similar melt index capability to that of treated catalyst at a given reactor temperature. It is very important to hold this variable constant with supported chromium oxide catalysts since experience has shown that with ethylene polymers made with such catalysts, the ratio of high load melt index to melt index (HLMI/MI) is sensitive to reactor temperature. The ratio is thought to relate to polymer molecular weight distribution, the greater the ratio the broader the molecular weight distribution. HLMI is determined in accordance with ASTM D 1238-65T (Condition F) and MI is determined in accordance with ASTM D 1238-65T (Condition E), with each flow value expressed as grams per 10 minutes.

A weighed sample of each catalyst in the 0.03 to 0.06 g range was employed in the particle form polymerization of ethylene in a stirred, stainless steel reactor of one gallon capacity (3.8 L) containing 1.2 L of isobutane diluent. A reactor pressure of 565 psia (4.52 MPa) was used at the temperature specified. Ethylene was supplied on demand to the reactor during the reaction from a pressurized reservoir. Each run was conducted for sufficient time to provide an estimated 5,000 grams polymer per gram catalyst. The recovered product was dried, stabilized with a conventional antioxidant such as 2,6-di-t-butyl-4-methylphenol, and the MI and HLMI values determined.

The flame treatment used in catalyst preparation and the polymerization results obtained are given in the table.

TABLE

| | | Ethylene Polymerization | | | | | | |
|---|---|---|---|---|---|---|---|---|
| | | Catalyst | | Run | Polymer | | | |
| Run No. | Reactor Temp. °C. | Collection Zone | Activated Color | Time, min. | Weight, g | MI | HLMI MI | Remarks |
| 1 | 102 | C | green, orange tinge | — | about 5 | — | — | Inactive |
| 2 | 110 | C | green, orange tinge | — | about 2 | — | — | Inactive |
| 3 | 102 | B | orange, green tinge | 45 | 185.5 | 0.44 | 113 | Invention |
| 4 | 106 | B | orange, green tinge | 43 | 155.3 | 1.5 | 63 | Invention |
| 5 | 110 | B | orange, green tinge | 70 | 238 | 2.6 | 64 | Invention |
| 6 | 102 | — | orange, green tinge | 42 | 135 | 0.4 | 71 | Control |
| 7 | 106 | — | orange, green tinge | 45 | 172 | 1.6 | 47 | Control |

TABLE-continued

| | | Ethylene Polymerization | | | | | | |
|---|---|---|---|---|---|---|---|---|
| | | Catalyst | | Run | Polymer | | HLMI | |
| Run No. | Reactor Temp. °C. | Collection Zone | Activated Color | Time, min. | Weight, g | MI | MI | Remarks |
| 8 | 110 | — | orange, green tinge | 43 | 170 | 2.4 | 42 | Control |

Catalyst from collection zone A was little influenced by its brief exposure to the flame. Its color after activation was identical to the color of the control catalyst. Polymer was not made with that catalyst. Catalyst from collection zone C was overtreated. Its color after activation was green and it had poor catalytic properties as the results in runs 1, 2 demonstrate. However, invention catalyst from collection zone B, utilized in runs 3, 4, and 5 had received enough flame treatment to at least partially sinter the exterior of the particles while essentially leaving the interior of the particles unchanged. The treatment thus afforded a single catalyst capable of producing polymer having average molecular weights differing in magnitude depending upon whether the catalytically active sites are located in the interior or exterior portions of the catalyst. The polymer produced with the invention catalyst exhibits a much broader molecular weight distribution than that produced with untreated catalyst when the comparison is made with polymer made at the same reactor temperature and having about the same melt index.

While this invention has been described in detail for the purpose of illustration, it is not to be construed as limited thereby but is intended to cover all changes and modifications within the spirit and scope thereof.

I claim:

1. A method comprising:
subjecting a particulate silica-containing material to a heat treatment for a time and at a temperature sufficient to sinter the outside of the particles of said silica-containing material without significantly affecting the inside of the particles, said silica-containing material either having chromium contained therein during said heat treatment or having chromium thereafter added thereto.

2. A method according to claim 1 wherein said thus heat treated silica-containing material containing said chomium is activated by heating in an oxygen-containing ambient.

3. A method according to claim 2 wherein said heat treatment is effected by passing said silica-containing material already containing said chromium through a flame, and wherein said silica-containing material is a silica-titania cogel.

4. A method comprising:
passing a particulate silica-containing material through a zone at a temperature within the range of 1200° to 4000° C. for a residence time within the range of 0.1 to 3 seconds, said silica-containing material either containing chromium during said passing or having chromium thereafter added thereto.

5. A method according to claim 4 wherein the thus heat treated silica-containing material containing said chromium is activated by heating in an oxygen-containing ambient at a temperature within the range of 600° to 800° C. for a time within the range of 0.5 to 24 hours.

6. A method according to claim 4 wherein said silica-containing material is a silica-titania-chromium tergel.

7. A method according to claim 4 wherein said silica-containing material is a silica-titania cogel containing 1 to 12 weight percent titanium.

8. A method according to claim 7 wherein said chromium is present during said passing.

9. A method according to claim 8 wherein said chromium is introduced by combining an aqueous solution of a chromium compound selected from $CrO_3$, chromium acetate and chromium nitrate with said cogel at a hydrogel stage thereof and said cogel is formed by adding sodium silicate to sulfuric acid containing a titanium compound, aging, washing with water to remove sodium ions and removing water by contact with one of ethyl acetate, or a 5 or 6 carbon atom alcohol.

10. A method according to claim 9 wherein said zone of 1200° to 4000° C. is a flame and said time range is 0.5 to 2 seconds.

11. A catalyst produced by the method of claim 10.

12. A catalyst produced by the method of claim 4.

* * * * *